United States Patent
Benedict et al.

(10) Patent No.: US 10,541,070 B2
(45) Date of Patent: Jan. 21, 2020

(54) METHOD FOR FORMING A BED OF STABILIZED MAGNETO-CALORIC MATERIAL

(71) Applicants: General Electric Company, Schenectady, NY (US); UT-Battelle, LLC, Oak Ridge, TN (US)

(72) Inventors: Michael Alexander Benedict, Louisville, KY (US); Ayyoub Mehdizadeh Momen, Knoxville, TN (US)

(73) Assignees: Haier US Appliance Solutions, Inc., Wilmington, DE (US); UT-Batelle, LLC, Oak Ridge, TN (US)

( * ) Notice: Subject to any disclaimer, the term of this patent is extended or adjusted under 35 U.S.C. 154(b) by 0 days.

(21) Appl. No.: 15/137,049

(22) Filed: Apr. 25, 2016

(65) Prior Publication Data

US 2017/0309380 A1 Oct. 26, 2017

(51) Int. Cl.
*H01F 1/12* (2006.01)
*H01F 1/01* (2006.01)

(52) U.S. Cl.
CPC .................................. *H01F 1/015* (2013.01)

(58) Field of Classification Search
CPC .......... H01F 1/012; H01F 1/015; H01F 1/017; F25B 21/00; B22F 1/0059; B22F 1/0062; B22F 1/007; B22F 1/0074; B22F 1/0077; B22F 1/02; B22F 2001/0066
USPC ........................ 427/550, 547, 598
See application file for complete search history.

(56) References Cited

U.S. PATENT DOCUMENTS

| | | | |
|---|---|---|---|
| 1,985,455 A | 12/1934 | Mosby | |
| 2,671,929 A | 3/1954 | Gayler | |
| 3,618,265 A | 11/1971 | Croop | |
| 3,816,029 A | 6/1974 | Bowen et al. | |
| 3,956,076 A | 5/1976 | Powell, Jr. et al. | |
| 4,102,655 A | 7/1978 | Jeffery et al. | |
| 4,197,709 A | 4/1980 | Hochstein | |
| 4,200,680 A * | 4/1980 | Sasazawa | G11B 5/70673 427/128 |
| 4,507,928 A | 4/1985 | Johnson | |
| 4,554,790 A | 11/1985 | Nakagome et al. | |
| 4,557,228 A | 12/1985 | Samodovitz | |
| 4,599,866 A | 7/1986 | Nakagome et al. | |

(Continued)

FOREIGN PATENT DOCUMENTS

| | | |
|---|---|---|
| CA | 2893874 A1 | 6/2014 |
| CA | 2919117 A1 | 1/2015 |

(Continued)

OTHER PUBLICATIONS

Barbara Pulko, Epoxy-bonded La—Fe—Co—Si magnetocaloric plates, Journal of Magnetism and Magnetic Materials, 375 (2015) 65-73.

(Continued)

*Primary Examiner* — Tabassom Tadayyon Eslami
(74) *Attorney, Agent, or Firm* — Dority & Manning, P.A.

(57) ABSTRACT

A method for forming a stabilized bed of magneto-caloric material is provided. The method includes aligning magneto-caloric particles within the casing while a magnetic field is applied to the magneto-caloric particles and then fixing positions of the magneto-caloric particles within the casing. A related stabilized bed of magneto-caloric material is also provided.

20 Claims, 5 Drawing Sheets

(56) References Cited

U.S. PATENT DOCUMENTS

| | | | |
|---|---|---|---|
| 4,735,062 A | 4/1988 | Woolley et al. | |
| 4,741,175 A | 5/1988 | Schulze | |
| 4,785,636 A | 11/1988 | Hakuraku et al. | |
| 4,796,430 A | 1/1989 | Malaker et al. | |
| 5,190,447 A | 3/1993 | Schneider | |
| 5,336,421 A * | 8/1994 | Kurita | C01G 49/0063 252/62.62 |
| 5,351,791 A | 10/1994 | Rosenzweig | |
| 5,599,177 A | 2/1997 | Hetherington | |
| 5,661,895 A | 9/1997 | Irgens | |
| 5,718,570 A | 2/1998 | Beckett et al. | |
| 6,423,255 B1 * | 7/2002 | Hoechsmann | B29C 67/0081 264/113 |
| 6,467,274 B2 | 10/2002 | Barclay et al. | |
| 6,517,744 B1 * | 2/2003 | Hara | B29C 70/025 148/108 |
| 6,526,759 B2 | 3/2003 | Zimm et al. | |
| 6,612,816 B1 | 9/2003 | Vanden Brande et al. | |
| 6,826,915 B2 | 12/2004 | Wada et al. | |
| 6,840,302 B1 | 1/2005 | Tanaka et al. | |
| 6,915,647 B2 | 7/2005 | Tsuchikawa et al. | |
| 6,946,941 B2 | 9/2005 | Chell | |
| 6,971,245 B2 | 12/2005 | Kuroyanagi | |
| 7,148,777 B2 | 12/2006 | Chell et al. | |
| 7,297,270 B2 | 11/2007 | Bernard et al. | |
| 7,863,789 B2 | 1/2011 | Zepp et al. | |
| 7,938,632 B2 | 5/2011 | Smith | |
| 8,061,147 B2 | 11/2011 | Dinesen et al. | |
| 8,069,662 B1 | 12/2011 | Albert | |
| 8,174,245 B2 | 5/2012 | Carver | |
| 8,216,396 B2 | 7/2012 | Dooley et al. | |
| 8,310,325 B2 | 11/2012 | Zhang et al. | |
| 8,616,009 B2 | 12/2013 | Dinesen et al. | |
| 8,763,407 B2 | 7/2014 | Carroll et al. | |
| 8,904,806 B2 | 12/2014 | Cramet et al. | |
| 8,935,927 B2 | 1/2015 | Kobayashi et al. | |
| 8,978,391 B2 | 3/2015 | Muller et al. | |
| 9,175,885 B2 | 11/2015 | Katter | |
| 9,245,673 B2 | 1/2016 | Carroll et al. | |
| 9,377,221 B2 | 6/2016 | Benedict | |
| 9,400,126 B2 | 7/2016 | Takahashi et al. | |
| 9,523,519 B2 | 12/2016 | Muller | |
| 9,534,817 B2 | 1/2017 | Benedict et al. | |
| 9,548,151 B2 | 1/2017 | Muller | |
| 9,599,374 B2 | 3/2017 | Takahashi et al. | |
| 9,631,843 B2 | 4/2017 | Benedict | |
| 9,702,594 B2 | 7/2017 | Vetrovec | |
| 9,739,510 B2 | 8/2017 | Hassen | |
| 9,797,630 B2 | 10/2017 | Benedict et al. | |
| 9,810,454 B2 | 11/2017 | Tasaki et al. | |
| 9,857,105 B1 | 1/2018 | Schroeder et al. | |
| 9,857,106 B1 | 1/2018 | Schroeder et al. | |
| 9,927,155 B2 | 3/2018 | Boeder et al. | |
| 9,978,487 B2 | 5/2018 | Katter et al. | |
| 10,006,675 B2 | 6/2018 | Benedict et al. | |
| 10,018,385 B2 | 7/2018 | Radermacher et al. | |
| 2002/0040583 A1 | 4/2002 | Barclay et al. | |
| 2002/0066368 A1 * | 6/2002 | Zornes | B01J 20/3441 96/1 |
| 2002/0087120 A1 | 7/2002 | Rogers et al. | |
| 2003/0010054 A1 | 1/2003 | Esch et al. | |
| 2003/0051774 A1 | 3/2003 | Saito | |
| 2004/0093877 A1 | 5/2004 | Wada | |
| 2004/0182086 A1 | 9/2004 | Chiang et al. | |
| 2004/0187510 A1 | 9/2004 | Jung | |
| 2004/0187803 A1 | 9/2004 | Regev | |
| 2005/0017394 A1 | 1/2005 | Hochsmann et al. | |
| 2005/0109490 A1 | 5/2005 | Harmon et al. | |
| 2005/0274676 A1 | 12/2005 | Kumar et al. | |
| 2006/0130518 A1 | 6/2006 | Kang et al. | |
| 2006/0231163 A1 * | 10/2006 | Hirosawa | H01F 1/015 148/105 |
| 2007/0130960 A1 | 6/2007 | Muller et al. | |
| 2007/0220901 A1 | 9/2007 | Kobayashi | |
| 2008/0236171 A1 | 10/2008 | Saito et al. | |
| 2008/0236175 A1 | 10/2008 | Chaparro Monferrer et al. | |
| 2008/0303375 A1 | 12/2008 | Carver | |
| 2009/0091411 A1 | 4/2009 | Zhang et al. | |
| 2009/0217674 A1 * | 9/2009 | Kaji | F25B 21/00 62/3.1 |
| 2009/0236930 A1 | 9/2009 | Nashiki | |
| 2009/0266083 A1 | 10/2009 | Shin et al. | |
| 2009/0308080 A1 | 12/2009 | Han et al. | |
| 2010/0058775 A1 | 3/2010 | Kaji et al. | |
| 2010/0116471 A1 | 5/2010 | Reppel | |
| 2010/0122488 A1 | 5/2010 | Fukai | |
| 2010/0150747 A1 | 6/2010 | Mehta | |
| 2010/0162747 A1 | 7/2010 | Hamel et al. | |
| 2010/0209084 A1 | 8/2010 | Nelson et al. | |
| 2010/0276627 A1 | 11/2010 | Mazet | |
| 2010/0303917 A1 | 12/2010 | Watson et al. | |
| 2011/0000206 A1 | 1/2011 | Aprad | |
| 2011/0048031 A1 | 3/2011 | Barve | |
| 2011/0048690 A1 * | 3/2011 | Reppel | F25B 21/00 165/185 |
| 2011/0058795 A1 | 3/2011 | Kleman et al. | |
| 2011/0061398 A1 | 3/2011 | Shih et al. | |
| 2011/0062821 A1 | 3/2011 | Chang et al. | |
| 2011/0082026 A1 * | 4/2011 | Sakatani | B01J 21/063 502/159 |
| 2011/0094243 A1 | 4/2011 | Carron et al. | |
| 2011/0154832 A1 * | 6/2011 | Barve | F28D 17/02 62/3.1 |
| 2011/0168363 A9 * | 7/2011 | Reppel | F25B 21/00 165/133 |
| 2011/0218921 A1 | 9/2011 | Addala et al. | |
| 2011/0284196 A1 | 11/2011 | Zanadi | |
| 2011/0302931 A1 | 12/2011 | Sohn | |
| 2011/0314836 A1 | 12/2011 | Heitzler et al. | |
| 2012/0031108 A1 | 2/2012 | Kobayashi et al. | |
| 2012/0045698 A1 | 2/2012 | Shima | |
| 2012/0060526 A1 | 3/2012 | May et al. | |
| 2012/0222428 A1 | 9/2012 | Celik et al. | |
| 2012/0266591 A1 | 10/2012 | Morimoto et al. | |
| 2012/0266607 A1 | 10/2012 | Morimoto et al. | |
| 2012/0272665 A1 | 11/2012 | Watanabe et al. | |
| 2012/0291453 A1 * | 11/2012 | Watanabe | F25B 21/00 62/3.1 |
| 2013/0020529 A1 | 1/2013 | Chang et al. | |
| 2013/0106116 A1 | 5/2013 | Kuo et al. | |
| 2013/0145573 A1 | 6/2013 | Bizhanzadeh | |
| 2013/0180263 A1 | 7/2013 | Choi et al. | |
| 2013/0186107 A1 | 7/2013 | Shih et al. | |
| 2013/0199460 A1 | 8/2013 | Duplessis et al. | |
| 2013/0227965 A1 | 9/2013 | Yagi et al. | |
| 2013/0255279 A1 | 10/2013 | Tomimatsu et al. | |
| 2013/0298571 A1 | 11/2013 | Morimoto et al. | |
| 2013/0300243 A1 | 11/2013 | Gieras et al. | |
| 2013/0327062 A1 | 12/2013 | Watanabe et al. | |
| 2014/0020881 A1 | 1/2014 | Reppel et al. | |
| 2014/0116538 A1 | 5/2014 | Tanaka et al. | |
| 2014/0165594 A1 | 6/2014 | Benedict | |
| 2014/0190182 A1 | 7/2014 | Benedict | |
| 2014/0260373 A1 | 9/2014 | Gerber et al. | |
| 2014/0290273 A1 | 10/2014 | Benedict et al. | |
| 2014/0290275 A1 | 10/2014 | Muller | |
| 2014/0291570 A1 | 10/2014 | Klausner et al. | |
| 2014/0305137 A1 | 10/2014 | Benedict | |
| 2014/0366557 A1 | 12/2014 | Mun et al. | |
| 2015/0007582 A1 | 1/2015 | Kim et al. | |
| 2015/0027133 A1 | 1/2015 | Benedict | |
| 2015/0030483 A1 | 1/2015 | Ryu | |
| 2015/0033763 A1 * | 2/2015 | Saito | F25B 21/00 62/3.1 |
| 2015/0047371 A1 | 2/2015 | Hu et al. | |
| 2015/0068219 A1 * | 3/2015 | Komorowski | F25B 21/00 62/3.1 |
| 2015/0089960 A1 | 4/2015 | Takahashi et al. | |
| 2015/0114007 A1 | 4/2015 | Neilson et al. | |
| 2015/0211440 A1 | 7/2015 | Joffroy | |
| 2015/0267943 A1 | 9/2015 | Kim et al. | |
| 2015/0369524 A1 | 12/2015 | Ikegami et al. | |

(56) References Cited

U.S. PATENT DOCUMENTS

| | | |
|---|---|---|
| 2016/0000999 A1 | 1/2016 | Focht et al. |
| 2016/0032920 A1 | 2/2016 | Hatami Aghdam |
| 2016/0084544 A1 | 3/2016 | Radermacher et al. |
| 2016/0091227 A1 | 3/2016 | Leonard et al. |
| 2016/0216012 A1 | 7/2016 | Benedict et al. |
| 2016/0238287 A1 | 8/2016 | Benedict |
| 2016/0273811 A1 | 9/2016 | Smith et al. |
| 2016/0282021 A1 | 9/2016 | Zhao et al. |
| 2016/0355898 A1* | 12/2016 | Vieyra Villegas ... C21D 9/0068 |
| 2016/0356529 A1 | 12/2016 | Humburg |
| 2016/0367982 A1 | 12/2016 | Pennie |
| 2017/0059213 A1 | 3/2017 | Barclay et al. |
| 2017/0138648 A1 | 5/2017 | Cui et al. |
| 2017/0176083 A1 | 6/2017 | Sul et al. |
| 2017/0328603 A1 | 11/2017 | Barclay et al. |
| 2017/0328649 A1 | 11/2017 | Brandmeier |
| 2017/0370624 A1 | 12/2017 | Zimm et al. |
| 2018/0005735 A1 | 1/2018 | Scharf et al. |
| 2018/0023852 A1 | 1/2018 | Schroeder et al. |
| 2018/0195775 A1 | 7/2018 | Schroeder et al. |
| 2018/0283740 A1 | 10/2018 | Holladay et al. |

FOREIGN PATENT DOCUMENTS

| | | |
|---|---|---|
| CN | 101979937 A | 2/2011 |
| CN | 201772566 U | 3/2011 |
| CN | 202432596 U | 9/2012 |
| CN | 103090583 A | 5/2013 |
| CN | 103712401 A | 4/2014 |
| CN | 102077303 B | 4/2015 |
| CN | 106481842 A | 3/2017 |
| DE | 102013223959 A1 | 5/2015 |
| DE | 202015106851 U1 | 3/2016 |
| EP | 0187078 A1 | 7/1986 |
| EP | 2071255 A1 | 6/2009 |
| EP | 2108904 A1 | 10/2009 |
| EP | 2215955 A1 | 8/2010 |
| EP | 2322072 A2 | 5/2011 |
| EP | 2420760 A1 | 2/2012 |
| EP | 3306082 A2 | 4/2018 |
| FR | 2935468 A1 | 3/2010 |
| JP | 59-232922 * | 12/1984 |
| JP | H08166182 A | 6/1996 |
| JP | 3205196 B2 | 9/2001 |
| JP | 2002315243 A | 10/2002 |
| JP | 2007147136 A | 6/2007 |
| JP | 2007291437 A | 11/2007 |
| JP | 2008051412 A | 3/2008 |
| JP | 20101112606 A | 5/2010 |
| JP | 201052591 A | 7/2010 |
| JP | 6212955 B2 | 12/2014 |
| JP | 2014228216 A | 12/2014 |
| JP | 5907023 B2 | 4/2016 |
| JP | 6079498 B2 | 2/2017 |
| JP | 6191539 B2 | 9/2017 |
| JP | 2017207222 A | 11/2017 |
| KR | 101100301 B1 | 12/2011 |
| KR | 1238234 B1 | 3/2013 |
| WO | WO 0212800 A1 | 2/2002 |
| WO | WO 03016794 A1 | 2/2003 |
| WO | WO 2004/068512 | 8/2004 |
| WO | WO 2007/036729 A1 | 4/2007 |
| WO | WO 2009/024412 | 2/2009 |
| WO | WO2010/119591 A1 | 10/2010 |
| WO | WO 2011034594 A1 | 3/2011 |
| WO | WO 2014099199 A1 | 6/2014 |
| WO | WO 2014170447 A1 | 10/2014 |
| WO | WO 2014173787 A1 | 10/2014 |
| WO | WO 2015017230 A1 | 2/2015 |
| WO | WO2016035267 A1 | 3/2016 |
| WO | WO 2017042266 A1 | 3/2017 |
| WO | WO2017097989 A1 | 6/2017 |

OTHER PUBLICATIONS

International Search Report issued in connection with PCT Application No. PCT/US2014/042485 dated Oct. 23, 2014.

International Search Report issued in connection with PCT Application No. PCT/US2014/017431 dated May 9, 2014.

International search report issued in connection with PCT Application No. PCT/US2013/070518, dated Jan. 22, 2014.

Tetsuji Okamura, Performance of a room-temperature rotary magnet refrigerator, dated Nov. 28, 2005, Elsevier.

Journal of Alloys and Compounds, copyright 2008 Elsevier B.. V. Evaluation of Ni—Mn—In—Si Alloys for Magnetic Refrigerant Application, Rabul Das, A. Perumal and A. Srinivasan, Dept of Physics, Indian Institute of Technology, Oct. 10, 2011.

Effects of annealing on the magnetic entropy change and exchange bias behavior in melt-spun Ni—Mn—In ribbons, X.Z. Zhao, C.C. Hsieh, et al Science Direct, Scripta Materialia 63 (2010).

PCT International Search Report and Written Opinion issued in connection with PCT Application No. PCT/US2013/070023 dated Feb. 27, 2014.

International Search Report of PCT/US2014/047925 dated Nov. 10, 2014.

C Aprea, et al., An innovative rotary permanent magnet magnetic refrigerator based on AMR cycle, Thermal Energy Systems: Production, Storage, Utilization and the Environment, dated May 2015, Napoli, Italy, pp. 1-5.

* cited by examiner

METHOD FOR FORMING A BED OF STABILIZED MAGNETO-CALORIC MATERIAL

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present subject matter relates generally to magneto-caloric material beds and methods of forming the same.

BACKGROUND OF THE INVENTION

Conventional refrigeration technology typically utilizes a heat pump that relies on compression and expansion of a fluid refrigerant to receive and reject heat in a cyclic manner so as to effect a desired temperature change or i.e. transfer heat energy from one location to another. This cycle can be used to provide e.g., for the receiving of heat from a refrigeration compartment and the rejecting of such heat to the environment or a location that is external to the compartment. Other applications include air conditioning of residential or commercial structures. A variety of different fluid refrigerants have been developed that can be used with the heat pump in such systems.

While improvements have been made to such heat pump systems that rely on the compression of fluid refrigerant, at best such can still only operate at about forty-five percent or less of the maximum theoretical Carnot cycle efficiency. Also, some fluid refrigerants have been discontinued due to environmental concerns. The range of ambient temperatures over which certain refrigerant-based systems can operate may be impractical for certain locations. Other challenges with heat pumps that use a fluid refrigerant exist as well.

Magneto-caloric materials (MCMs), i.e. materials that exhibit the magneto-caloric effect, provide a potential alternative to fluid refrigerants for heat pump applications. In general, the magnetic moments of an MCM will become more ordered under an increasing, externally applied magnetic field and cause the MCM to generate heat. Conversely, decreasing the externally applied magnetic field will allow the magnetic moments of the MCM to become more disordered and allow the MCM to absorb heat. Some MCMs exhibit the opposite behavior, i.e. generating heat when the magnetic field is removed (which are sometimes referred to as para-magneto caloric material but both types are referred to collectively herein as magneto-caloric material or MCM). The theoretical percent of Carnot cycle efficiency achievable for a refrigeration cycle based on an MCM can be significantly higher than for a comparable refrigeration cycle based on a fluid refrigerant. As such, a heat pump system that can effectively use an MCM would be useful.

Challenges exist to the practical and cost competitive use of an MCM, however. In addition to the development of suitable MCMs, equipment that can attractively utilize an MCM is still needed. For example, an MCM that transfers heat to a fluid with minimal energy usage would be useful. In particular, an MCM with that provides high heat transfer to the fluid and low pressure drop through the MCM would be useful.

BRIEF DESCRIPTION OF THE INVENTION

The present subject matter provides a method for forming a stabilized bed of magneto-caloric material. The method includes aligning magneto-caloric particles within the casing while a magnetic field is applied to the magneto-caloric particles and fixing the magneto-caloric particles within the casing. A related stabilized bed of magneto-caloric material is also provided. Additional aspects and advantages of the invention will be set forth in part in the following description, or may be apparent from the description, or may be learned through practice of the invention.

In a first exemplary embodiment, a method for forming a stabilized bed of magneto-caloric material is provided. The method includes applying a magnetic field to a plurality of magneto-caloric particles disposed within a casing, flowing an adhesive through the casing over the magneto-caloric particles within the casing while the magnetic field is applied to the magneto-caloric particles, and hardening the adhesive such that the magneto-caloric particles are coupled together with the adhesive. A related stabilized bed of magneto-caloric material is also provided In a second exemplary embodiment, a method for forming a stabilized bed of magneto-caloric material is provided. The method includes coating a plurality of magneto-caloric particles with a binder, applying a magnetic field to the plurality of magneto-caloric particles such the magneto-caloric particles align into chains within a casing, and activating the binder on the plurality of magneto-caloric particles while the magnetic field is applied to the magneto-caloric particles such that the chains of magneto-caloric particles are coupled together with the binder.

In a third exemplary embodiment, a stabilized bed of magneto-caloric material is provided. The stabilized bed of magneto-caloric material includes a casing. A plurality of chains of magneto-caloric particles is disposed within the casing. A hardened adhesive couples the chains of magneto-caloric particles together within the casing. Adjacent chains of magneto-caloric particles are spaced apart from each other by a gap within the casing. The gap is no less than fifty microns and no greater than two hundred microns.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
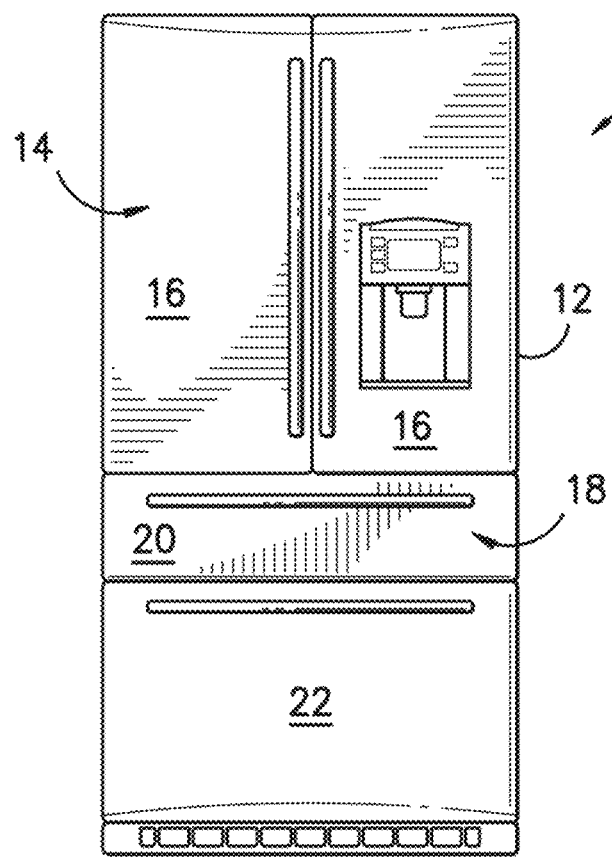
FIG. 1 provides a front view of a refrigerator appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, an exemplary embodiment of a refrigerator appliance 10 is depicted as an upright refrigerator having a cabinet or casing 12 that defines a number of internal storage compartments or chilled chambers. In particular, refrigerator appliance 10 includes upper fresh-food compartments 14 having doors 16 and lower freezer compartment 18 having upper drawer 20 and lower drawer 22. The drawers 20, 22 are "pull-out" type drawers in that they can be manually moved into and out of the freezer compartment 18 on suitable slide mechanisms. Refrigerator 10 is provided by way of example only. Other configurations for a refrigerator appliance may be used as well including appliances with only freezer compartments, only chilled compartments, or other combinations thereof different from that shown in FIG. 1. In addition, the heat pump and heat pump system of the present subject matter is not limited to appliances and may be used in other applications as well such as e.g., air-conditioning, electronics cooling devices, and others. Thus, it should be understood that while the use of a heat pump to provide cooling within a refrigerator is provided by way of example herein, the present subject matter may also be used to provide for heating applications as well.

Figure 2:
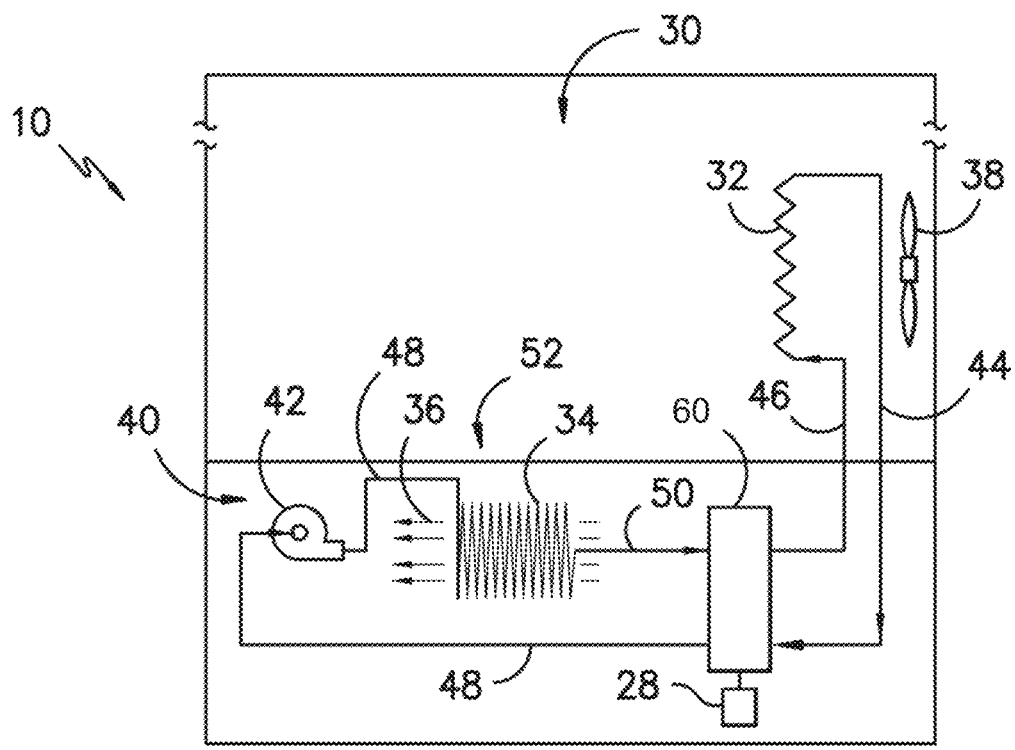
FIG. 2 provides a schematic illustration of certain components of a heat pump system according to an exemplary embodiment of the present subject matter positioned in an exemplary refrigerator appliance.

FIG. 2 is a schematic view of another exemplary embodiment of refrigerator appliance 10 including a refrigeration compartment 30 and a machinery compartment 40. In particular, machinery compartment 30 includes a heat pump system 52 having a first heat exchanger 32 positioned in the refrigeration compartment 30 for the removal of heat therefrom. A heat transfer fluid such as e.g., an aqueous solution or any other gas, liquid, molten metal, magnetic fluid, nano-fluid, etc., flowing within first heat exchanger 32 receives heat from the refrigeration compartment 30 thereby cooling its contents. A fan 38 may be used to provide for a flow of air across first heat exchanger 32 to improve the rate of heat transfer from the refrigeration compartment 30.

The heat transfer fluid flows out of first heat exchanger 32 by line 44 to a heat pump 60. As will be further described herein, the heat transfer fluid receives additional heat from magneto-caloric material (MCM) in heat pump 60 and carries this heat by line 48 to pump 42 and then to second heat exchanger 34. Heat is released to the environment, machinery compartment 40, and/or other location external to refrigeration compartment 30 using second heat exchanger 34. A fan 36 may be used to create a flow of air across second heat exchanger 34 and thereby improve the rate of heat transfer to the environment. Pump 42 connected into line 48 causes the heat transfer fluid to recirculate in heat pump system 52. Motor 28 is in mechanical communication with heat pump 60 as will further described.

From second heat exchanger 34 the heat transfer fluid returns by line 50 to heat pump 60 where, as will be further described below, the heat transfer fluid loses heat to the MCM in heat pump 60. The now colder heat transfer fluid flows by line 46 to first heat exchanger 32 to receive heat from refrigeration compartment 30 and repeat the cycle as just described.

Heat pump system 52 is provided by way of example only. Other configurations of heat pump system 52 may be used as well. For example, lines 44, 46, 48, and 50 provide fluid communication between the various components of the heat pump system 52 but other heat transfer fluid recirculation loops with different lines and connections may also be employed. For example, pump 42 can also be positioned at other locations or on other lines in system 52. Still other configurations of heat pump system 52 may be used as well. Heat pump 60 may be any suitable heat pump with MCM. For example, heat pump 60 may be constructed or arranged in the manner described in U.S. Patent Publication No. 2014/0165594 of Michael Alexander Benedict Now abandoned, which is hereby incorporated by reference in its entirety.

During operation of heat pump 60, MCM may be exposed to a magnetic field, which causes the magnetic moments of the MCM to orient and the MCM to heat as part of the magneto-caloric effect. Ordering of the magnetic field is created and maintained while the MCM is exposed to the magnetic field such that the heat transfer fluid dwelling in the MCM is heated. In turn, the heat transfer fluid heated by the MCM can travel out of heat pump 60 and along line 48 to the second heat exchanger 34. At the same time, heat transfer fluid from first heat exchanger 32 flows into the MCM within heat pump 60 from line 44. Because heat transfer fluid from the first heat exchanger 32 is relatively cooler than the MCM, the MCM will lose heat to the heat transfer fluid.

The MCM may then be moved, completely or substantially, out of magnetic field. The absence or lessening of the magnetic field is such that the magnetic moments of the material become disordered and the MCM absorbs heat as part of the magneto-caloric effect. In turn, the heat transfer fluid dwelling in the MCM is cooled by losing heat to the MCM as the magnetic moments disorder. The heat transfer fluid, now cooled by the MCM, can then travel out of heat pump 60 and along line 46 to the first heat exchanger 32. At the same time, heat transfer fluid from second heat exchanger 34 flows into heat pump 60 from line 50. Because heat transfer fluid from the second heat exchanger 34 is relatively warmer than the MCM, the MCM will lose some of its heat to the heat transfer fluid. The heat transfer fluid now travels along line 46 to the first heat exchanger 32 to receive heat and cool the refrigeration compartment 30. The above described process may be repeated such that heat pump 60 moves MCM into and out of a magnetic field in order to cool refrigeration compartment 30. A motor 28 in mechanical communication with the MCM within heat pump 60 may move the MCM into and out of the magnetic field.

The MCM within heat pump 60 may be constructed from a single magneto-caloric material or may include multiple different magneto-caloric materials. By way of example, appliance 10 may be used in an application where the ambient temperature changes over a substantial range. However, a specific magneto caloric material may exhibit the magneto-caloric effect over only a much narrower temperature range. As such, it may be desirable to use a variety of magneto-caloric materials within a given stage to accommodate the wide range of ambient temperatures over which appliance 10 and/or heat pump 60 may be used.

Figure 3:
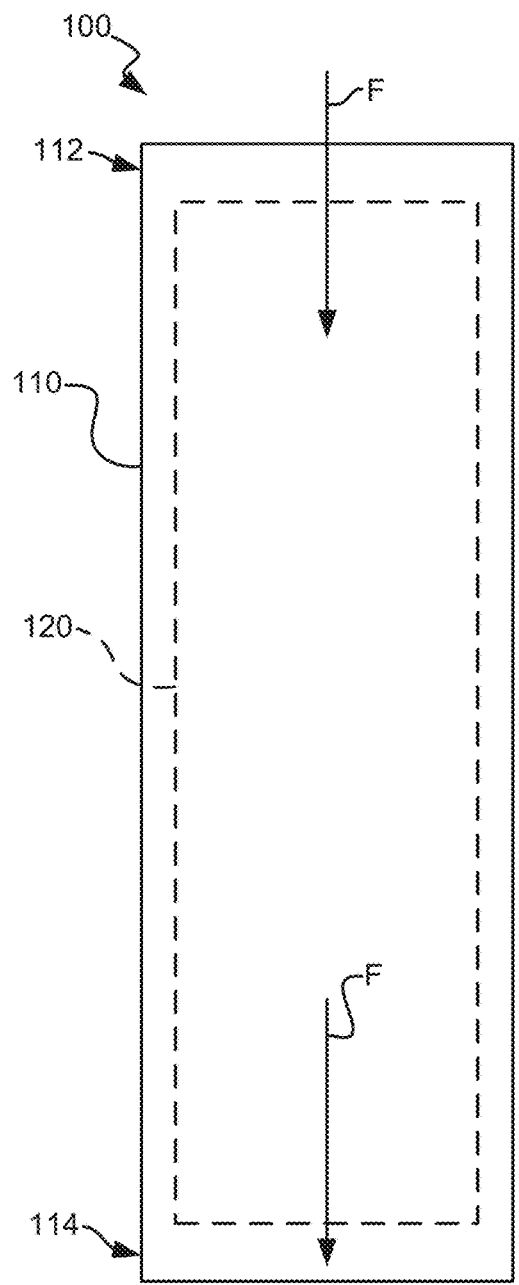
FIG. 3 provides a front, plan view of a stabilized bed of magneto-caloric material according to an exemplary embodiment of the present subject matter.
Figure 3:
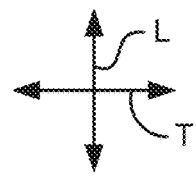
Figure 4:
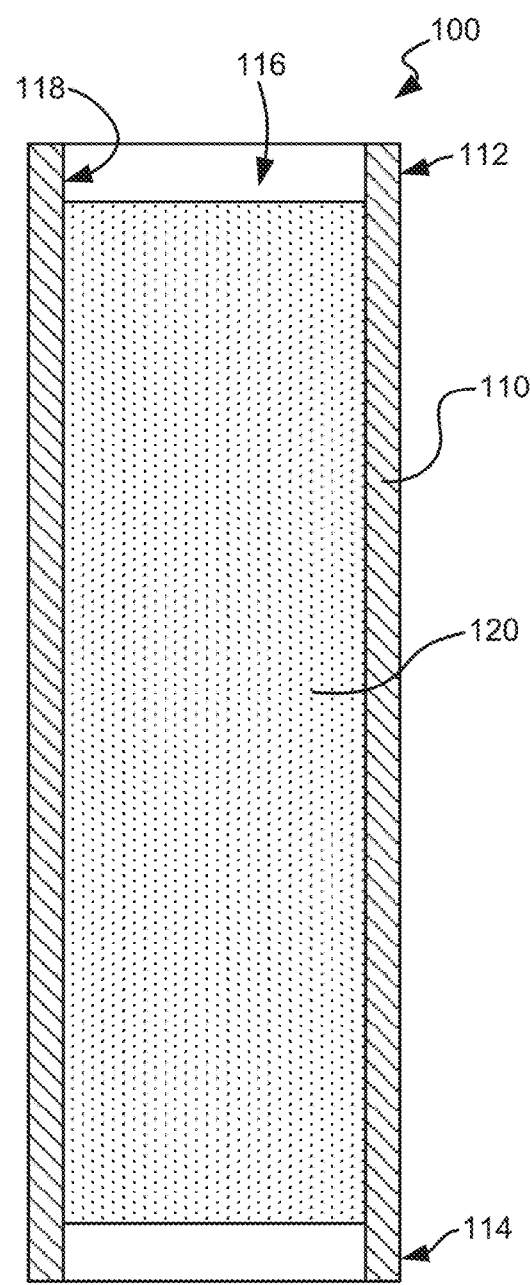
FIG. 4 provides a section view of the exemplary stabilized bed of magneto-caloric material of FIG. 3.
Figure 4:
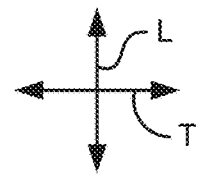

FIG. 3 provides a front, plan view of a stabilized bed of magneto-caloric material 100 according to an exemplary embodiment of the present subject matter. FIG. 4 provides a section view of stabilized bed of magneto-caloric material 100. Stabilized bed of magneto-caloric material 100 may be used in or with any suitable heat pump. For example, stabilized bed of magneto-caloric material 100 may be used in or with heat pump 60 to transfer heat between first and second heat exchangers 32, 34 via the heat transfer fluid within heat pump system 52. Thus, stabilized bed of magneto-caloric material 100 is discussed in greater detail below in the context of heat pump 60. Stabilized bed of magneto-caloric material 100 includes features for facilitating heat transfer with the heat transfer fluid within heat pump system 52.

As may be seen in FIG. 3, stabilized bed of magneto-caloric material 100 defines a longitudinal direction L and a transverse direction T. The longitudinal direction L and transverse direction T are perpendicular to each other. Stabilized bed of magneto-caloric material 100 also includes a casing 110. Casing 110 extends between a first end portion 112 and a second end portion 114, e.g., along the longitudinal direction L. A flow of fluid F, such as the heat transfer fluid within heat pump system 52, may enter casing 110 at first end portion 112 or second end portion 114 of casing 110 and flow through casing 110, e.g., along the longitudinal direction L. Thus, casing 110 may contain and guide the flow of fluid F through stabilized bed of magneto-caloric material 100 between first and second end portions 112, 114 of casing 110.

Casing 110 may be any suitable type of casing. As an example, casing 110 may be a tubular casing, such as a tube or pipe. Casing 110 may also be made of any suitable material, e.g., metallic, plastic or composite material, including non-ferrous material, such as vinyl tubing or plastic piping. Further, casing 110 may have any suitable cross-section shape, e.g., in a plane that is perpendicular to the longitudinal direction L, such as circular, arcuate, etc.

Stabilized bed of magneto-caloric material 100 also includes a plurality of magneto-caloric particles 120. Magneto-caloric particles 120 are disposed within casing 110, e.g., between first and second end portions 112, 114 of casing 110 along the longitudinal direction L. In particular, magneto-caloric particles 120 may be positioned within an interior volume 116 of casing 110, with interior volume 116 defined by an inner surface 118 of casing 110. With magneto-caloric particles 120 disposed within casing 110, the flow of fluid F through casing 110 may flow through or over magneto-caloric particles 120. Thus, when a magnetic field engages magneto-caloric particles 120, heat transfer between magneto-caloric particles 120 and the flow of fluid F through casing 110 may assist with cooling refrigeration compartment 30, as discussed above.

Figure 5:
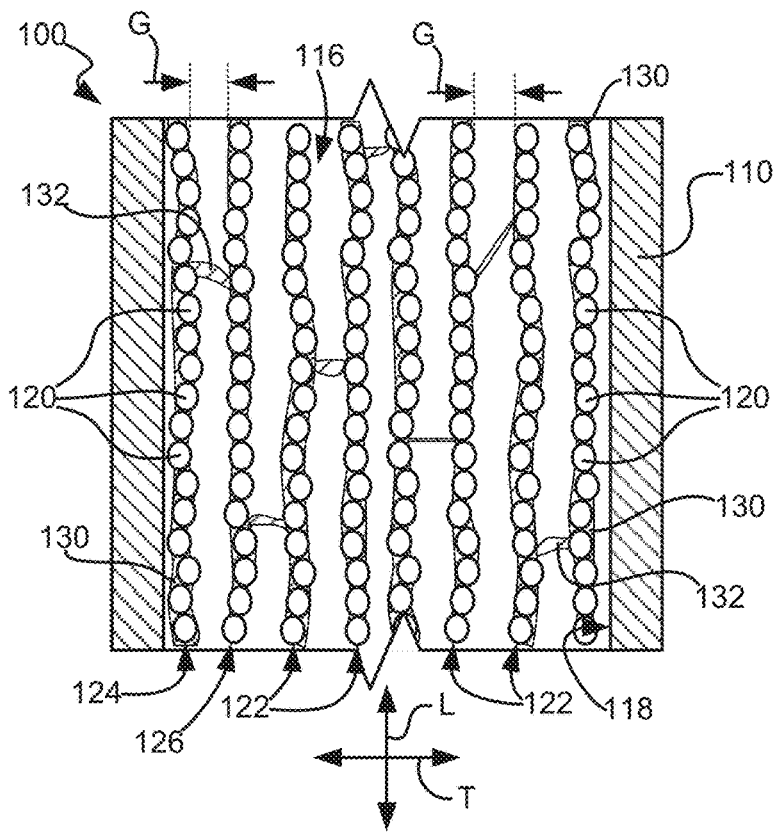
FIG. 5 provides a partial, section view of the exemplary stabilized bed of magneto-caloric material of FIG. 3 and chains of magneto-caloric material within the exemplary stabilized bed of magneto-caloric material.

FIG. 5 provides a partial, section view of stabilized bed of magneto-caloric material 100. Magneto-caloric particles 120 may be any suitable magneto-caloric particles. For example, magneto-caloric particles 120 may include any suitable combination or alloy of: (1) gadolinium, silicon and germanium; or (2) nickel, magnesium, and gallium, etc. As another example, magneto-caloric particles 120 may be selected from the thermomagnetic or magneto-caloric materials described in U.S. Pat. No. 8,763,407 of Carroll et al., which is incorporated by reference herein in its entirety. Magneto-caloric particles 120 may have any suitable shape, such as spherical, non-spherical, elongated, wire-shape, jagged, etc. Magneto-caloric particles 120 may also have any suitable size. For example, magneto-caloric particles 120 may be particles between one hundred microns and one hundred and fifty microns. As another example, magneto-caloric particles 120 may be particles between one hundred microns and four hundred and fifty microns. An aspect ratio of each individual particle may also vary between one and five hundred. Magneto-caloric particles 120 may include secondary particles, such as iron, copper, brass, carbon nanotubes, graphite, etc., in certain exemplary embodiments. The secondary particles may enhance magnetic field, thermal conductivity or both.

As may be seen in FIG. 5, magneto-caloric particles 120 are formed into a plurality of chains 122 within casing 110. Magneto-caloric particles 120 within chains 122 of magneto-caloric particles 120 are coupled together with adhesive 130. Thus, adhesive 130 may couple magneto-caloric particles 120 into chains 122 within casing 110. Branches 132 of adhesive 130 may also extend between adjacent chains 122 of magneto-caloric particles 120 in order to couple the adjacent chains 122 of magneto-caloric particles 120 to each other within casing 110.

Adhesive 130 may be any suitable adhesive. For example, adhesive 130 may be an epoxy, such an epoxy with high strength, viscosity, durability and water resistance. As a particular example, adhesive 130 may be Paraloid™ B72 resin. It should be understood that any suitable binder may be used to couple magneto-caloric particles 120 into chains 122 of magneto-caloric particles 120 in alternative exemplary embodiments rather than adhesive 130. For example, a thermally activated polymer binder, an ultraviolet activated polymer binder or any other suitable polymer binder may be used rather than adhesive 130 to bind magneto-caloric particles 120 into chains 122 of magneto-caloric particles 120 in alternative exemplary embodiments.

Figure 6:
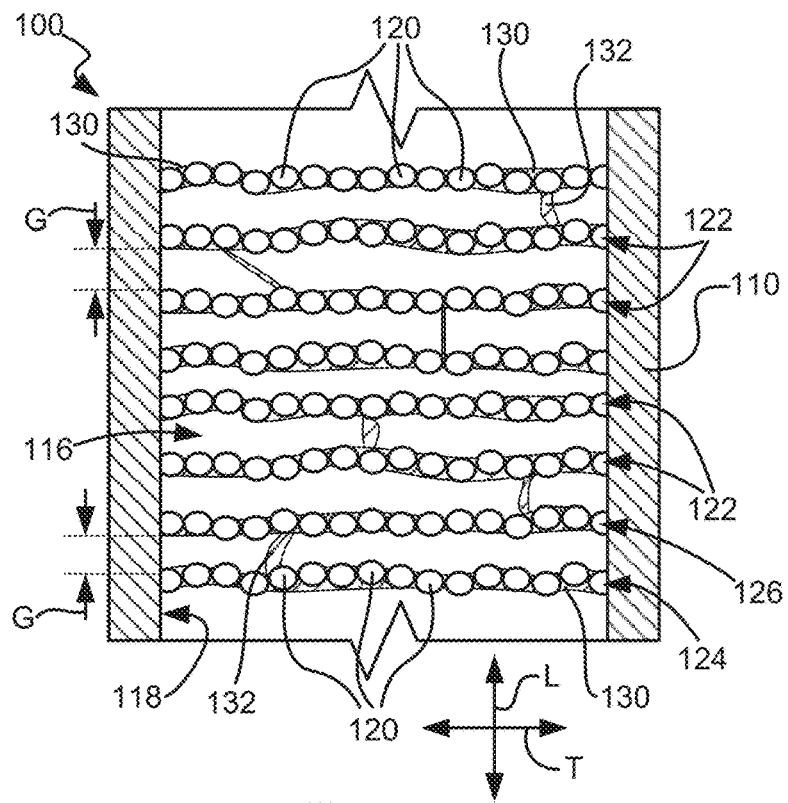
FIG. 6 provides another partial, section view of the exemplary stabilized bed of magneto-caloric material of FIG. 3 with the chains of magneto-caloric material within the exemplary stabilized bed of magneto-caloric material oriented orthogonally relative to the orientation shown in FIG. 5.

Chains 122 of magneto-caloric particles 120 may be oriented within casing 110 to facilitate heat transfer with the flow of fluid F while limiting a pressure drop of the fluid F between first and second end portions 112, 114 of casing 110. For example, chains 122 of magneto-caloric particles 120 may be oriented or extend along the longitudinal direction L within casing 110. Thus, the flow of fluid F may flow along the longitudinal direction L between chains 122 of magneto-caloric particles 120 within casing 110. It should be understood that chains 122 of magneto-caloric particles 120 need not extend in a perfect or straight manner, e.g., along the longitudinal direction L, within casing 110. Thus, e.g., chains 122 may have widths of multiple magneto-caloric particles 120 along the transverse direction T and/or chains 122 may taper or extend slightly along the transverse direction T within casing 110. For example, FIG. 6 provides another partial, section view of chains 122 of magneto-caloric particles 120. In FIG. 6, chains 122 of magneto-caloric particles 120 are oriented or extend along the transverse direction T within casing 110. Thus, the flow of fluid F may flow along the longitudinal direction L across chains 122 of magneto-caloric particles 120 within casing 110. In alternative exemplary embodiments, chains 122 of magneto-caloric particles 120 may be oriented to any suitable orientation between the two orientations illustrated in FIGS. 5 and 6, e.g., to boost magnetization of magneto-caloric particles 120.

Adjacent chains 122 of magneto-caloric particles 120 may be spaced apart from each other, e.g., along the transverse direction T, by a gap G within casing 110. As an example, a first chain 124 may be spaced apart from a second chain 126 along the transverse direction T by the gap G within casing 110. The gaps G defined between adjacent chains 122 of magneto-caloric particles 120 may provide flow paths or channels for the flow of fluid F through casing 110. The gap G may be sized to facilitate heat transfer with the flow of fluid F while limiting a pressure drop of the fluid F between first and second end portions 112, 114 of casing 110. As an example, the gap G between adjacent chains 122 of magneto-caloric particles 120 may be no less than fifty microns and no greater than two hundred microns, e.g., along the transverse direction T. As another example, the gap G between adjacent chains 122 of magneto-caloric particles 120 may be no less than one hundred microns and no greater than four hundred and fifty microns, e.g., along the transverse direction T. Thus, the gap G between adjacent chains 122 of magneto-caloric particles 120 may be about equal to the size of magneto-caloric particles 120, in certain exemplary embodiments. As used herein, the term "about" means within twenty percent of the stated size when used in the context of particle sizes.

Figure 7:
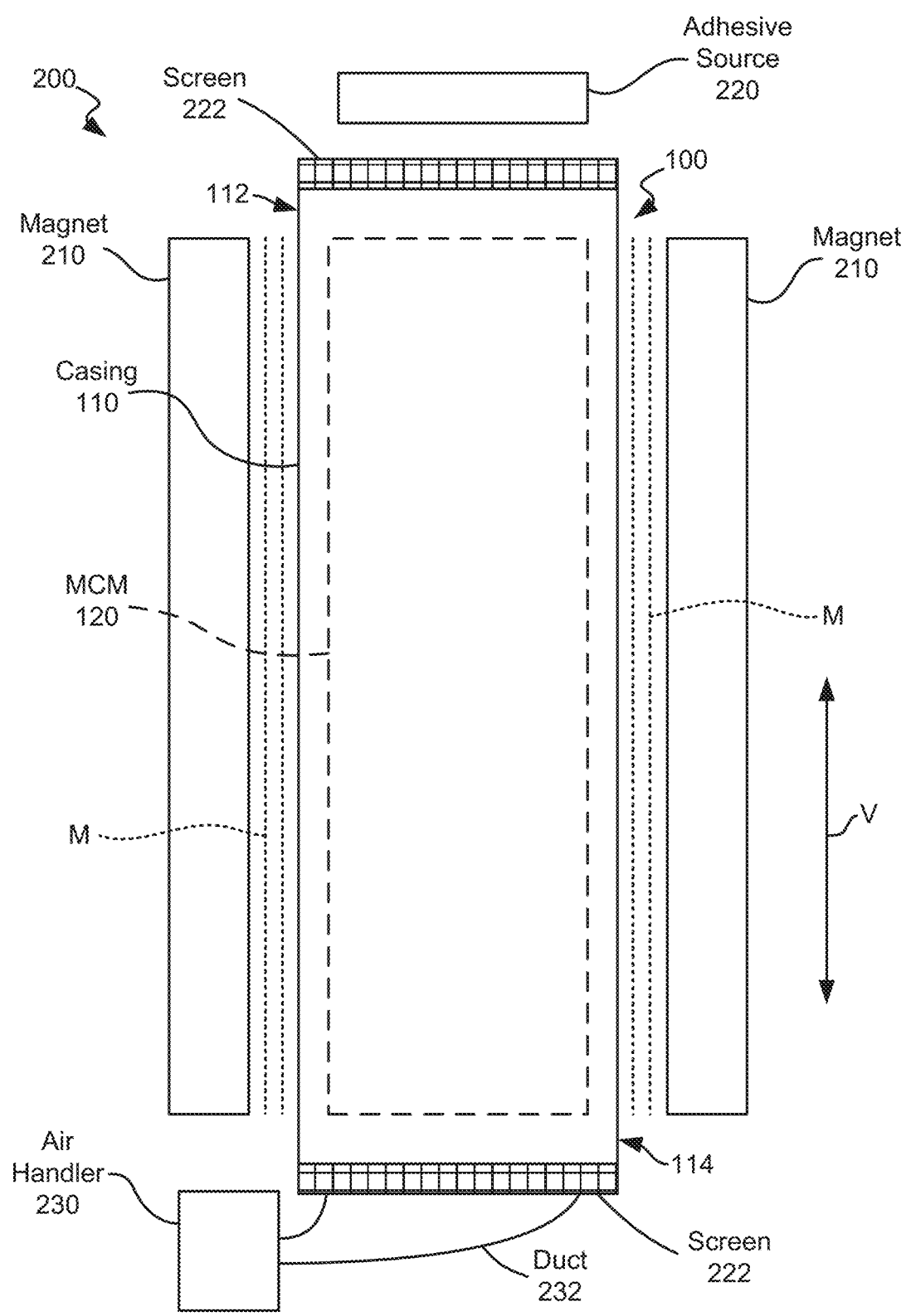
FIG. 7 provides a schematic view of the exemplary stabilized bed of magneto-caloric material of FIG. 3 during formation.

FIG. 7 provides a schematic view of stabilized bed of magneto-caloric material 100 during formation. A system 200 and methods for forming stabilized bed of magneto-caloric material 100 with the characteristics described above with reference to FIGS. 3 through 5 are discussed in greater detail below in the context of FIG. 7. As may be seen in FIG. 7, system 200 includes a magnet 210, adhesive source 220, screen 222, air handler 230 and duct 232.

As a first step, magneto-caloric particles 120 may be loaded or poured into casing 110, without adhesive 130 coupling magneto-caloric particles 120 together as shown in FIG. 5. Magneto-caloric particles 120 need not fill casing 110. In particular, a head space may be provided above magneto-caloric particles 120 within casing 110 to permit expansion of magneto-caloric particles 120 during subsequent formation steps of stabilized bed of magneto-caloric material 100. As an example, a head space or spacing of between five and thirty percent of interior volume 116 of casing 110 may be provided above magneto-caloric particles 120 within casing 110. Thus, initially, magneto-caloric particles 120 may only fill between ninety-five and seventy percent of interior volume 116 of casing 110.

As may be seen in FIG. 7, casing 110 may be disposed within a magnetic field M generated by magnet 210. When the magnetic field M of magnet 210 is applied to magneto-caloric particles 120 within casing 110, magneto-caloric particles 120 align into chains 122 of magneto-caloric particles 120, e.g., in the manner shown in FIG. 5. The magnetic field M of magnet 210 may align magneto-caloric particles 120 into chains 122 of magneto-caloric particles 120, e.g., by stacking of individual magneto-caloric particles 120 on top of one another such that each chain 122 has the same magnetic polarity and adjacent chains 122 with opposite polarity may be naturally repulsed, thus leaving the gaps G between chains 122 of magneto-caloric particles 120, as discussed above.

The magnetic field M of magnet 210 may have any suitable strength. For example, the magnetic field M of magnet 210 may be a uniform magnetic field having a strength no less than fifty gauss and no greater than ten thousand. As another example, the magnetic field M of magnet 210 may be a uniform magnetic field having a strength no less than nine hundred and fifty gauss and no greater than one thousand, one hundred gauss. Magnet 210 may also be a cylindrical or flat magnet in certain exemplary embodiments. The magnetic field M of magnet 210 may also be non-uniform, e.g., in order to provide variation of the gaps G between chains 122 of magneto-caloric particles 120.

Depending upon the selection of the size of magneto-caloric particles 120 along with the strength of the magnetic field M, a portion of interior volume 116 of casing 110, e.g., along the longitudinal direction L, occupied by magneto-caloric particles 120 may increase by no less than five percent and no greater than thirty percent while the magnetic field M is applied to magneto-caloric particles 120 and magneto-caloric particles 120 form into chains 122. Such expansion of magneto-caloric particles 120, e.g., along the longitudinal direction L, within casing 110 while the magnetic field M is applied to magneto-caloric particles 120 may form the chains 122 of magneto-caloric particles 120 within casing 110 with the gaps G between adjacent chains 122 of magneto-caloric particles 120 and thereby permit the flow of fluid F to flow through magneto-caloric particles 120 in a manner that facilitates heat transfer between the flow of fluid F and magneto-caloric particles 120 and also limits the pressure drop of the fluid F within casing 110.

To further facilitate, alignment of magneto-caloric particles 120 align into chains 122 of magneto-caloric particles 120, casing 110 may be shaken or vibrated before and/or while the magnetic field M of magnet 210 is applied to magneto-caloric particles 120 within casing 110. Such mechanical motion of casing 110 and/or magneto-caloric particles 120 may free movement of magneto-caloric particles 120 within casing 110 and assist alignment of magneto-caloric particles 120 into chains 122 of magneto-caloric particles 120. Fluidization of magneto-caloric particles 120 during such shaking or vibrating may also be used to control porosity of stabilized bed of magneto-caloric material 100. For example, increasing the amplitude or frequency of shaking/vibration can lead to greater expansion of magneto-caloric particles 120 leading to higher porosity of stabilized bed of magneto-caloric material 100. The expansion due to fluidization may be confined by screen 222.

With magneto-caloric particles 120 aligned into chains 122 of magneto-caloric particles 120 within casing 110, system 200 also includes features for locking or fixing chains 122 of magneto-caloric particles 120 within casing 110. For example, adhesive 130 may flow from adhesive source 220 (e.g., a nozzle, tank, conduit, etc.) into casing 110 and flow over chains 122 of magneto-caloric particles 120 within casing 110, e.g., downwardly along vertical direction V from first end portion 112 of casing 110 towards second end portion 114 of casing 110. Thus, adhesive 130 may initially enter casing 110 as a liquid. The magnetic field M of magnet 210 may continue to be applied to magneto-caloric particles 120 within casing 110 while the adhesive 130 flows into casing 110. Adhesive 130 hardens such that chains 122 of magneto-caloric particles 120 are coupled together with adhesive 130. In such a manner, adhesive 130 may lock or fix magneto-caloric particles 120 aligned into chains 122 of magneto-caloric particles 120 after the chains 122 are formed with the magnetic field M of magnet 210 and/or by shaking casing 110. After the adhesive 130 hardens, stabilized bed of magneto-caloric material 100 may be removed from the magnetic field M of magnet 210 with chains 122 of magneto-caloric particles 120 remaining fixed in place within casing 110.

Various features of system 200 may facilitate uniform application of adhesive 130 within casing 110. For example, adhesive 130 may be diluted with an organic solvent, such as acetone, to facilitate flow of adhesive 130 through casing 110, e.g., when adhesive 130 is Paraloid™ B72 resin. As another example, screen 222 may spread the flow of adhesive 130 into casing 110 across the width of casing 110 as adhesive enters casing 110. As another example, air handler 230 may draw a flow of gas, such as an inert gas (e.g., nitrogen), with duct 232 through casing 110 as adhesive 130 flows through casing 110 and the flow of gas may limit hardening of adhesive 130, e.g., when adhesive 130 is air or water reactive. The flow of gas through casing 110 may also assist with drawing excess adhesive 130 out of casing 110 prior to adhesive 130 hardening. Fluidization of magneto-caloric particles 120 during such fluid flow may also be used to control porosity of stabilized bed of magneto-caloric material 100. For example, increasing the fluid flow rate can lead to greater expansion of magneto-caloric particles 120 leading to higher porosity of stabilized bed of magneto-caloric material 100.

Figure 8:
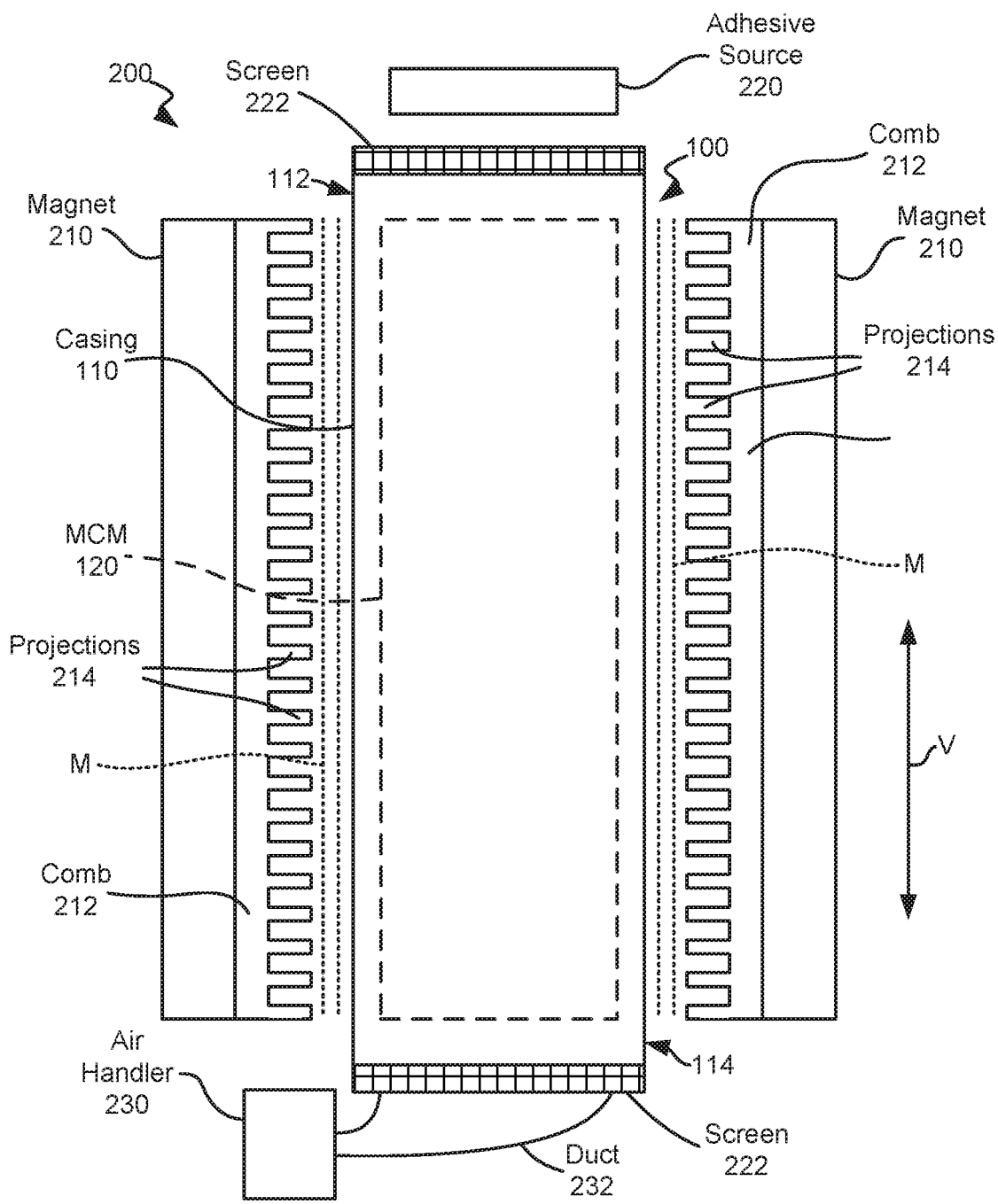
FIG. 8 provides another schematic view of the exemplary stabilized bed of magneto-caloric material of FIG. 3 during formation.

FIG. 8 provides another schematic view of stabilized bed of magneto-caloric material 100 during formation. As may be seen in FIG. 8, system 200 may include additional components for aligning magneto-caloric particles 120 align into chains 122 of magneto-caloric particles 120. In particular, the magnetic field M of magnet 210 applied to magneto-caloric particles 120 may be pre-focused in order to assist with seeding formation of channels between adjacent chains 122 of magneto-caloric particles 120.

As shown in FIG. 8, system 200 may include a comb 212 or other suitable structure with an array of projections, tines or ribs 214. Comb 212 may be disposed between magnet 210 and magneto-caloric particles 120 within casing 110. Comb 212 is constructed with a material that is permeable to the magnetic field M of magnet 210, such as steel. The magnetic field M of magnet 210 may be focused or concentrated at distal ends of projections 214 adjacent magneto-caloric particles 120. In addition, projections 214 may be uniformly spaced or distributed on comb 212 such that chains 122 of magneto-caloric particles 120 are also uniformly spaced or distributed within stabilized bed of magneto-caloric material 100, e.g., in a manner that is complementary to the distribution of projections 214 on comb 212. Thus, comb 212 and/or projections 214 may assist with promoting uniformity among chains 122 of magneto-caloric particles 120 and also assist with forming or positioning chains 122 of magneto-caloric particles 120 at uniform intervals within stabilized bed of magneto-caloric material 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forming a stabilized bed of magneto-caloric material, comprising:
    coating a plurality of magneto-caloric particles with a binder;
    applying a magnetic field to the plurality of magneto-caloric particles such that the magneto-caloric particles align into chains within a casing; and
    activating the binder on the plurality of magneto-caloric particles while the magnetic field is applied to the magneto-caloric particles such that the chains of magneto-caloric particles are coupled together with the binder, the chains of magneto-caloric particles fixed relative to one another with the binder after activating the binder;
    wherein each chain of magneto-caloric particles is spaced apart from an adjacent chain of magneto-caloric particles by a respective gap within the casing, each gap being no less than fifty microns and no greater than four hundred microns, and
    wherein each gap is unfilled between the chains of magneto-caloric particles such that each gap forms a channel for fluid flow and a heat transfer fluid is flowable through each gap between the chains of magneto-caloric particles within the casing.

2. The method of claim 1, wherein each gap is no less than one hundred microns and no greater than one hundred and fifty microns.

3. The method of claim 1, further comprising shaking the casing while the magnetic field is applied to the magneto-caloric particles within the casing.

4. The method of claim 1, wherein the binder is a polymer and said step of activating the binder comprises heating the binder.

5. The method of claim 1, wherein the binder is a polymer and said step of activating the binder comprises directing ultraviolet radiation onto the binder.

6. The method of claim 1, wherein the binder is a polymer and said step of activating the binder comprises applying a liquid activator onto the binder.

7. The method of claim 1, wherein the casing defines an interior volume, and the method further comprises:
    loading the plurality of magneto-caloric particles into the interior volume of the casing, wherein when the plurality of magneto-caloric particles are loaded into the casing, a head space is defined between the plurality of magneto-caloric particles and the casing, wherein the head space is between about five (5) and thirty (30) percent of the interior volume.

8. The method of claim 1, wherein the method further comprises:
    shaking the casing while the magnetic field is applied to the magneto-caloric particles within the casing; and
    fluidizing, at the same time as shaking, the magneto-caloric particles within the casing while the magnetic field is applied to the magneto-caloric particles.

9. The method of claim 1, wherein magneto-caloric particles include one or more secondary particles, the secondary particles including at least one of iron, copper, brass, carbon nanotubes, and graphite.

10. The method of claim 1, wherein the magnetic field is applied to the plurality of magneto-caloric particles such that the magneto-caloric particles align into chains extending along a longitudinal direction within the casing, and the heat transfer fluid is flowable along the longitudinal direction through the casing.

11. The method of claim 1, wherein the magnetic field is applied to the plurality of magneto-caloric particles such that the magneto-caloric particles align into chains extending along a transverse direction within the casing, the heat transfer fluid is flowable along a longitudinal direction through the casing, and the transverse direction is perpendicular to the longitudinal direction.

12. The method of claim 1, further comprising directing a gas through the casing over the chains of magneto-caloric particles within the casing while the magnetic field is applied to the magneto-caloric particles within the casing.

13. The method of claim 12, wherein the gas is an inert gas.

14. The method of claim 13, wherein the inert gas is nitrogen.

15. The method of claim 12, wherein the gas is directed over the magneto-caloric particles by an air handler.

16. The method of claim 1, further comprising fluidizing the magneto-caloric particles within the casing before the magnetic field is applied to the magneto-caloric particles, while the magnetic field is applied to the magneto-caloric particles, or both before and while the magnetic field is applied to the magneto-caloric particles.

17. The method of claim 16, wherein during fluidizing, the method comprises:
   directing a gas through the casing over the chains of magneto-caloric particles within the casing while the magnetic field is applied to the magneto-caloric particles within the casing; and
   increasing a fluid flow rate of the gas through the casing.

18. The method of claim 1, wherein a comb with a plurality of projections is positioned between the magnet and the plurality of magneto-caloric particles when the magnetic field is applied to the plurality of magneto-caloric particles.

19. The method of claim 18, wherein the comb is positioned outside of the casing.

20. The method of claim 18, wherein the plurality of projections are uniformly spaced on the comb.

* * * * *